US011509420B2

(12) United States Patent
Lin et al.

(10) Patent No.: US 11,509,420 B2
(45) Date of Patent: Nov. 22, 2022

(54) METHODS AND APPARATUS FOR FEC RATE ADAPTATION

(71) Applicant: QUALCOMM Incorporated, San Diego, CA (US)

(72) Inventors: Yih-Hao Lin, San Diego, CA (US); Peerapol Tinnakornsrisuphap, San Diego, CA (US); Ravi Agarwal, San Diego, CA (US); Prashanth Haridas Hande, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 17/064,572

(22) Filed: Oct. 6, 2020

(65) Prior Publication Data

US 2022/0109525 A1    Apr. 7, 2022

(51) Int. Cl.
*H04L 1/18* (2006.01)
*H04L 1/00* (2006.01)
*H04L 1/20* (2006.01)

(52) U.S. Cl.
CPC .......... *H04L 1/0061* (2013.01); *H04L 1/1812* (2013.01); *H04L 1/203* (2013.01)

(58) Field of Classification Search
CPC ... H04L 1/0001; H04L 1/0003; H04L 1/0009; H04L 1/0017; H04L 1/0018; H04L 1/007; H04L 1/1809; H04L 1/1812; H04L 1/1825; H04L 1/1877; H04N 21/234327; H04N 21/2383; H04N 21/2385; H04N 21/4126; H04N 21/43637; H04N 21/44209; H04N 21/6131; H04N 21/631; H04N 21/6375; H04N 21/6582; H04W 28/24; H04W 52/34; H04W 72/08; H04W 84/04
See application file for complete search history.

(56) References Cited

U.S. PATENT DOCUMENTS

2002/0054578 A1* 5/2002 Zhang ................... H04L 1/0018
370/335
2009/0052450 A1* 2/2009 Mockett ................ H04L 1/1809
370/390

(Continued)

FOREIGN PATENT DOCUMENTS

EP    2019559 A1    1/2009
WO    2018206073 A1    11/2018

OTHER PUBLICATIONS

International Search Report and Written Opinion—PCT/US2021/049705—ISA/EPO—dated Dec. 21, 2021.

*Primary Examiner* — Phuc H Tran
(74) *Attorney, Agent, or Firm* — Campbell Chiang; Procopio, Cory, Hargreaves & Savitch LLP

(57) ABSTRACT

The present disclosure relates to methods and devices for graphics or data processing including an apparatus, e.g., a network, a server, or a client device. In some aspects, the apparatus may transmit a request for an updated FEC rate, the updated FEC rate being based on a previous FEC rate. The apparatus may also receive, based on the request for the updated FEC rate, information associated with the updated FEC rate. Additionally, the apparatus may determine the updated FEC rate based on the received information, the received information being associated with a difference between the previous FEC rate and the updated FEC rate.

28 Claims, 9 Drawing Sheets

(56) References Cited

U.S. PATENT DOCUMENTS

2009/0185638 A1\* 7/2009 Imamura .......... H04W 72/0406
375/298
2015/0381209 A1\* 12/2015 Roh ................. H03M 13/2792
714/755

\* cited by examiner

METHODS AND APPARATUS FOR FEC RATE ADAPTATION

TECHNICAL FIELD

The present disclosure relates generally to processing systems and, more particularly, to one or more techniques for data or frame processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a network, a server, a client device, a modem, an infrastructure component, or any apparatus that can perform data or frame processing. The apparatus may operate or stream data based on a previous forward error correction (FEC) rate. The apparatus may also transmit a request for an updated FEC rate, the updated FEC rate being based on a previous FEC rate. The apparatus may also receive, based on the request for the updated FEC rate, information associated with the updated FEC rate. Additionally, the apparatus may calculate an average transport block (TB) size per frame based on the received information. The apparatus may also determine the updated FEC rate based on the received information, the received information being associated with a difference between the previous FEC rate and the updated FEC rate. The apparatus may also transmit, to a network or a server, an indication of the updated FEC rate. Moreover, the apparatus may adjust the previous FEC rate to the updated FEC rate based on the received information. The apparatus may also operate or stream data based on the updated FEC rate.

In another aspect of the disclosure, a method, a computer-readable medium, and an apparatus are provided. The apparatus may be a network, a server, a client device, a modem, an infrastructure component, or any apparatus that can perform data or frame processing. The apparatus may receive an indication of an updated forward error correction (FEC) rate, the updated FEC rate being based on a previous FEC rate, the received indication including a difference between the previous FEC rate and the updated FEC rate. The apparatus may also adjust a previous FEC rate to the updated FEC rate based on the received indication, the adjustment based on the difference between the previous FEC rate and the updated FEC rate.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
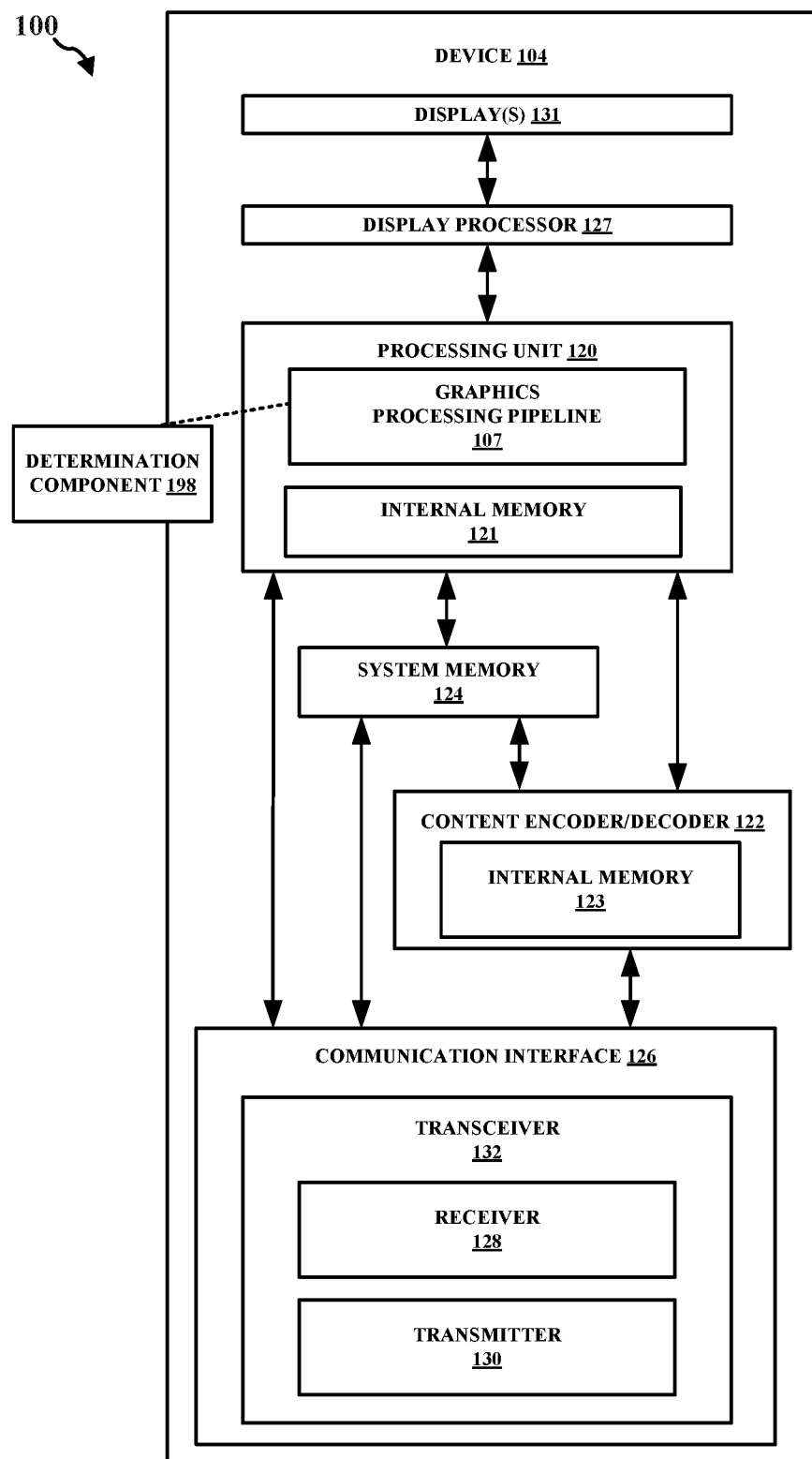
FIG. 1 is a block diagram that illustrates an example content generation system in accordance with one or more techniques of this disclosure.

In the current market, a number of cloud gaming or application platforms, e.g., extended reality (XR), augmented reality (AR), or virtual reality (VR) platforms, may employ FEC on video frames for reliability purposes. This FEC may occur with a fixed FEC rate. However, there are a number of potential issues with a fixed FEC rate when running on certain types of wireless communication, e.g., 5G networks. For example, there may be an insufficient FEC, e.g., less than a TB, which may result in resource waste, i.e., where a video frame cannot be 100% recovered from a single TB loss. In some aspects, there may also be an over-provisioned FEC, which may result in an increased scheduling latency of packets across video frames. Additionally, the effectiveness of FEC in maintaining low latency, e.g., latency at a 99th percentile, may vary with an allocated TB size and a number of TBs to transmit to a video frame. In order to balance between the latency performance and efficiency, it may be beneficial to adapt the FEC rate. Aspects of the present disclosure may be associated with FEC rate adaptation, e.g., based on a transport block allocation. Aspects of the present disclosure can also adapt the FEC rate in order to maintain a low latency. For instance, aspects of the present disclosure may adapt the FEC rate based on the TB size. Additionally, aspects of the present disclosure can adapt the FEC rate based on the number of TBs to transmit a video frame.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to operate or stream data based on a previous forward error correction (FEC) rate. The determination component 198 can also be configured to transmit a request for an updated FEC rate, the updated FEC rate being based on a previous FEC rate. The determination component 198 can also be configured to receive, based on the request for the updated FEC rate, information associated with the updated FEC rate. The determination component 198 can also be configured to calculate an average transport block (TB) size per frame based on the received information. The determination component 198 can also be configured to determine the updated FEC rate based on the received information, the received information being associated with a difference between the previous FEC rate and the updated FEC rate. The determination component 198 can also be configured to transmit, to a network or a server, an indication of the updated FEC rate. The determination component 198 can also be configured to adjust the previous FEC rate to the updated FEC rate based on the received information. The determination component 198 can also be configured to operate or stream data based on the updated FEC rate. In some aspects, the determination component 198 can also be configured to receive an indication of an updated forward error correction (FEC) rate, the updated FEC rate being based on a previous FEC rate, the received indication including a difference between the previous FEC rate and the updated FEC rate. The determination component 198 can also be configured to adjust a previous FEC rate to the updated FEC rate based on the received indication, the adjustment based on the difference between the previous FEC rate and the updated FEC rate.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
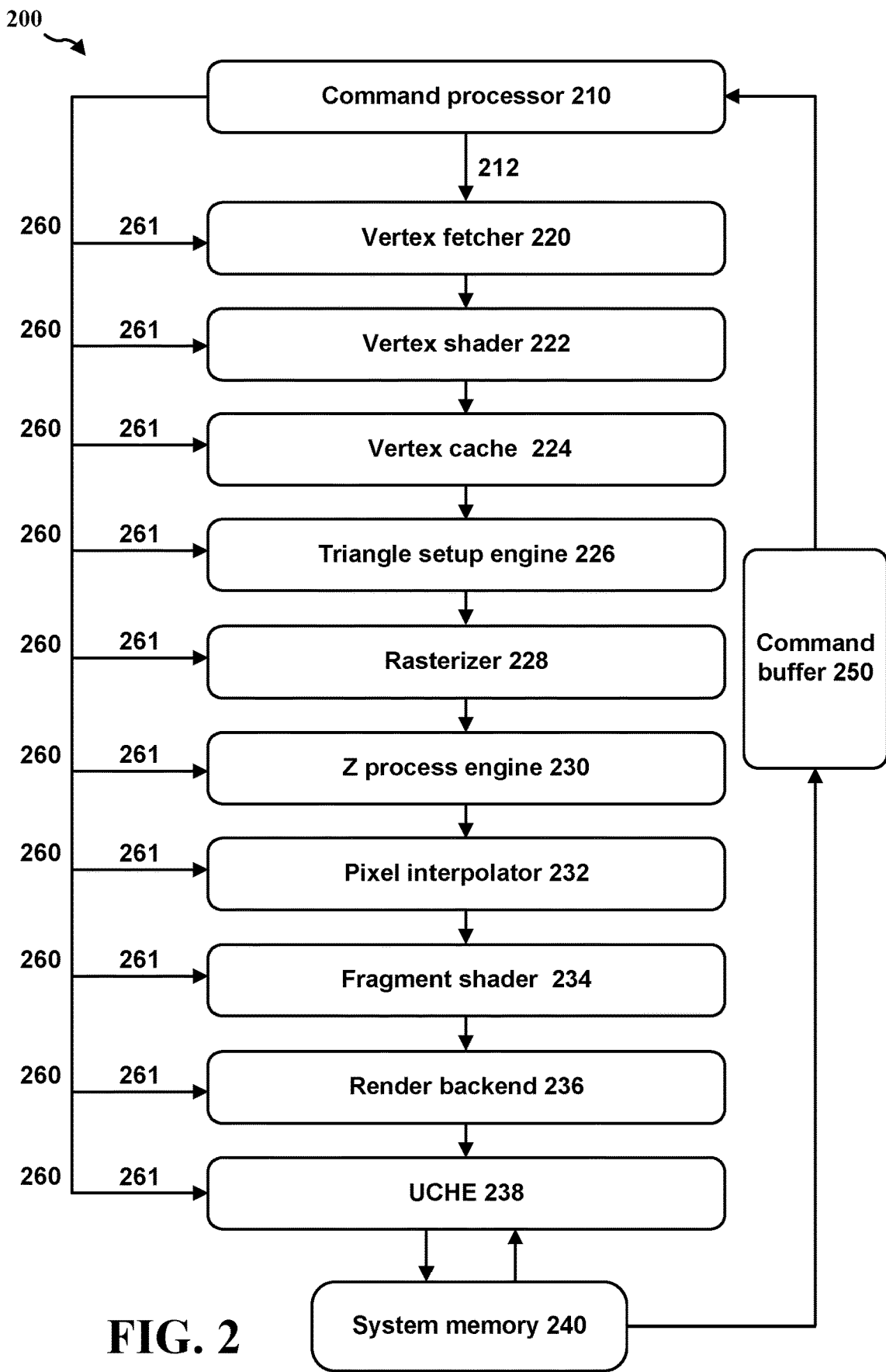
FIG. 2 illustrates an example GPU in accordance with one or more techniques of this disclosure.

FIG. 2 illustrates an example GPU 200 in accordance with one or more techniques of this disclosure. As shown in FIG.

2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

GPUs can render images in a variety of different ways. In some instances, GPUs can render an image using rendering or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. In some aspects, during the binning pass, a visibility stream can be constructed where visible primitives or draw calls can be identified.

In some aspects, GPUs can apply the drawing or rendering process to different bins or tiles. For instance, a GPU can render to one bin, and perform all the draws for the primitives or pixels in the bin. During the process of rendering to a bin, the render targets can be located in the GMEM. In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information for each primitive in each bin or area, e.g., in a system memory. This visibility information can be used to determine or generate a visibility stream. In a rendering pass, the primitives in each bin can be rendered separately. In these instances, the visibility stream can be fetched from memory used to drop primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

As indicated herein, in some aspects, such as in bin or tiled rendering architecture, frame buffers can have data stored or written to them repeatedly, e.g., when rendering from different types of memory. This can be referred to as resolving and unresolving the frame buffer or system memory. For example, when storing or writing to one frame buffer and then switching to another frame buffer, the data or information on the frame buffer can be resolved from the GPU internal memory (GMEM) at the GPU to the system memory, i.e., memory in the double data rate (DDR) RAM or dynamic RAM (DRAM).

In some aspects, the system memory can also be system-on-chip (SoC) memory or another chip-based memory to store data or information, e.g., on a device or smart phone. The system memory can also be physical data storage that is shared by the CPU and/or the GPU. In some aspects, the system memory can be a DRAM chip, e.g., on a device or smart phone. Accordingly, SoC memory can be a chip-based manner in which to store data.

In some aspects, the GMEM can be on-chip memory at the GPU, which can be implemented by static RAM (SRAM). Additionally, GMEM can be stored on a device, e.g., a smart phone. As indicated herein, data or information can be transferred between the system memory or DRAM and the GMEM, e.g., at a device. In some aspects, the system memory or DRAM can be at the CPU or GPU.

Additionally, data can be stored at the DDR or DRAM. In some aspects, such as in bin or tiled rendering, a small portion of the memory can be stored at the GPU, e.g., at the GMEM. In some instances, storing data at the GMEM may utilize a larger processing workload and/or power consumed compared to storing data at the frame buffer or system memory.

Some aspects of wireless communications, can be associated with a number of different applications, e.g., extended reality (XR), augmented reality (AR), or virtual reality (VR) applications. For cloud gaming or XR/AR/VR applications, video images may be rendered at a network or server based on user's control or pose feedback. These rendered images may be subsequently streamed to a client device or a user device. When running the service over a wireless communication network, e.g., a 5G network, the allowed over-the-air (OTA) delay for the above operations, including a video frame delivery, may be limited. In some aspects of wireless communications, e.g., 5G networks, hybrid automatic repeat request (HARQ) or radio link control (RLC) retransmissions may result in a higher frame delivery delay, e.g., a 99th percentile of delays, which may lead to an inferior user experience.

Figure 3:
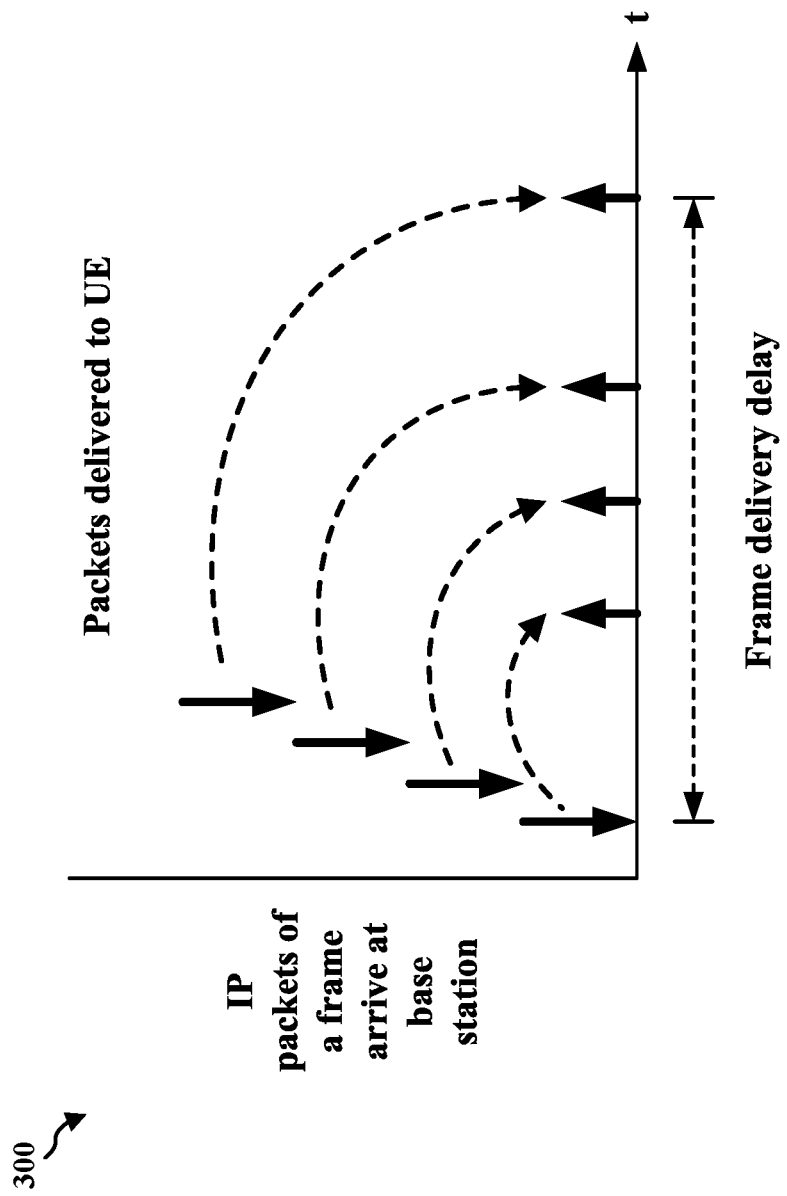
FIG. 3 illustrates an example graph illustrating IP packet arrival time versus IP packet delivery time in accordance with one or more techniques of this disclosure.

FIG. 3 illustrates graph 300 illustrating IP packet arrival time versus IP packet delivery time. More specifically, FIG. 3 shows IP packets of a frame arriving at a base station compared to the frame delivery delay. As shown in FIG. 3, the frame delivery delay is the interval from the first IP packet arriving at the base station to the last IP packet delivery at the UE. FIG. 3 also shows the frame delivery latency or delay, which is the difference between the IP packet arrival time at the base station and the IP packet delivery time to a UE.

Figure 4:
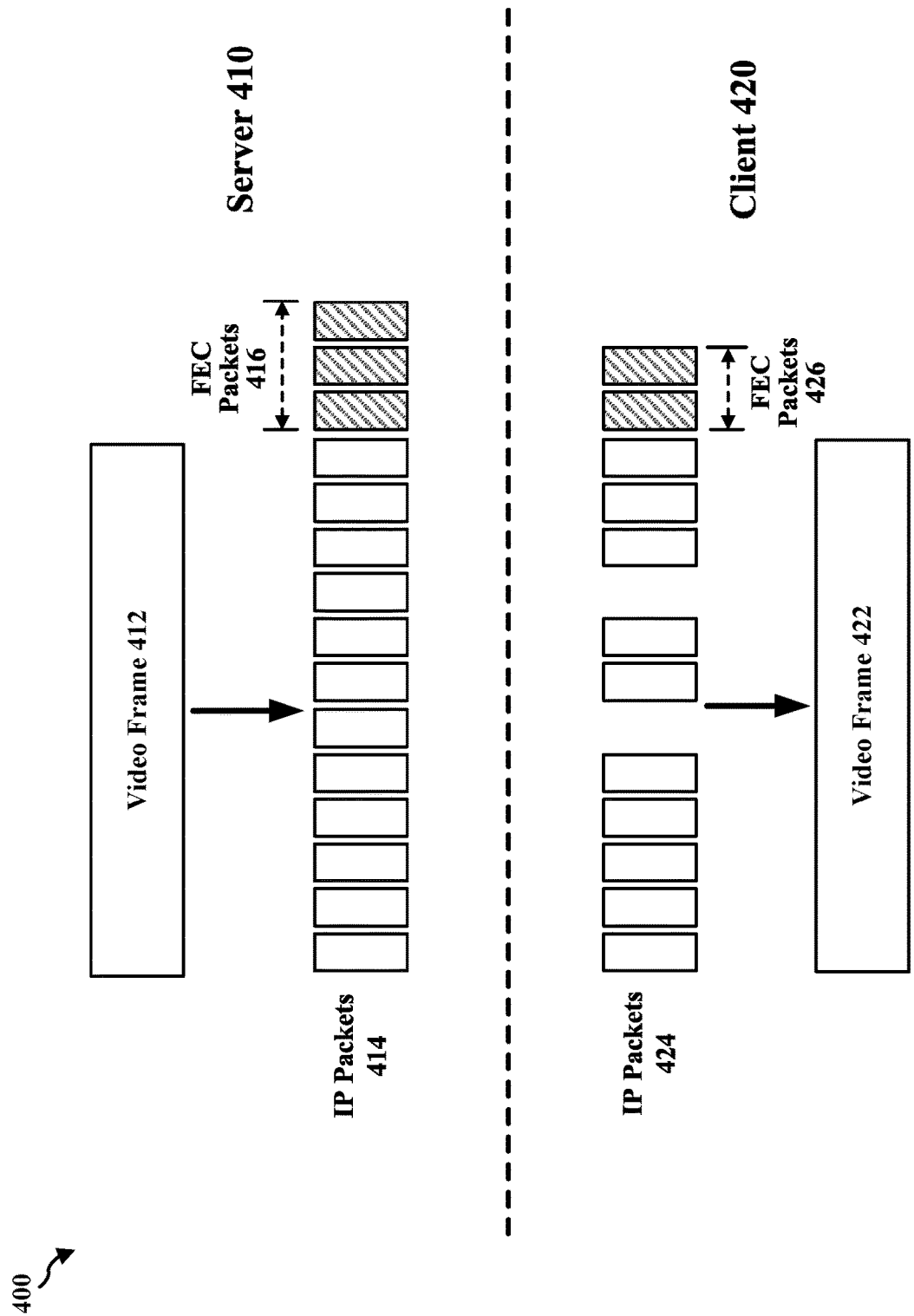
FIG. 4 illustrates an example diagram of FEC for a video frame in accordance with one or more techniques of this disclosure.

FIG. 4 illustrates diagram 400 of FEC for a video frame. As shown in FIG. 4, diagram 400 includes server 410 and client device 420. Diagram 400 also includes video frame 412 (a single white frame), IP packets 414 (multiple white packets), FEC packets 416 (multiple packets with diagonal lines), video frame 422 (a single white frame), IP packets 424 (multiple white packets), and FEC packets 426 (multiple packets with diagonal lines). As illustrated in FIG. 4, video frame 412, IP packets 414, FEC packets 416 correspond to server 410, and video frame 422, IP packets 424, and FEC packets 426 correspond to client device 420. FIG. 4 shows that applying forward error correction (FEC) on a video frame may help to improve the frame delivery latency. This may be subject to packet retransmissions, e.g., HARQ or RLC retransmissions. As shown in FIG. 4, the holes between the IP packets correspond to missing or late IP packets due to HARQ/RLC retransmissions. The redundancy from FEC may allow the UE to reconstruct the video frame subject to the missing PDUs. In some aspects, packet data convergence protocol (PDCP) out-of-order delivery may be enabled, so that the UE may not hold a received IP packet for any delayed packet ahead of it.

Figure 5:
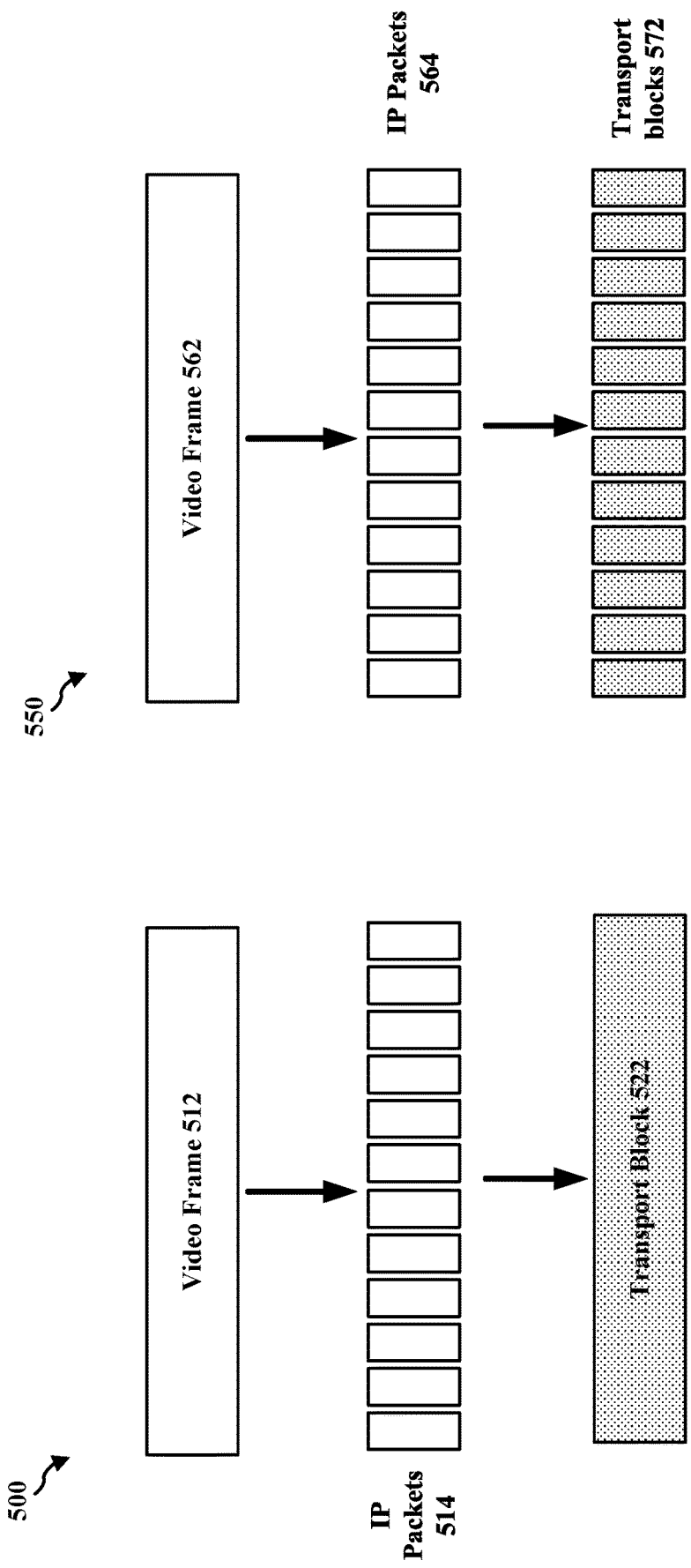
FIGS. 5A and 5B illustrate example diagrams of FEC for video frames in accordance with one or more techniques of this disclosure.

FIGS. 5A and 5B illustrate diagrams 500 and 550, respectively, of FEC for video frames. As shown in FIG. 5A, diagram 500 includes video frame 512 (a single white frame), IP packets 514 (multiple white packets), and transport block 522 (a single block with dots). As shown in FIG. 5B, diagram 550 includes video frame 562 (a single white frame), IP packets 564 (multiple white packets), and transport blocks 572 (multiple blocks with dots). FIGS. 5A and 5B show that the amount of FEC to be added may depend on the number of transport blocks (TBs) or slots that are used to carry a video frame.

As shown in FIG. 5A, diagram 500 depicts a high signal-to-noise ratio (SNR) or modulation and coding scheme (MCS), as well as a high resource block (RB) allocation. Also, FIG. 5A illustrates a single large transport block (TB) 522. As shown in FIG. 5A, a single large TB may convey that all the IP packets belong to a video frame. In some aspects, a single TB loss may correspond to a 100% frame loss when all IP packets of a video frame are carried by the same TB. In these instances, there may be 100% FEC redundancy for saving a single TB loss, but the probability of the loss may be low, as the residual BLER target is low. As such, the probability of an RLC retransmission occurring during a video frame transmission may also be low.

As shown in FIG. 5B, diagram 550 depicts a low SNR or MCS, as well as a low RB allocation. Moreover, FIG. 5B illustrates multiple smaller TBs, e.g., N TBs. In diagram 550, a single TB loss may correspond to a ~1/N frame loss. As shown in FIG. 5B, there may be ~(100/N) % FEC for saving a single TB loss. In some aspects, the probability of any IP packet loss of a video frame may be about N times higher than the residual BLER.

TABLE 1

| Video Frame Delivery Latency (ms) | |
| --- | --- |
| FEC (%) | 99% |
| 0 | 27.125 |
| 10 | 4.875 |
| 20 | 5 |
| 30 | 5.25 |

Table 1 above shows one example of video frame delivery latency with a low signal-to-interference plus noise ratio (SINR), e.g., corresponding to a small TB. For example, a 99% frame delivery latency may be reduced from 27 ms to 5 ms with a 10% FEC. The added overhead from 20% or 30% FEC may increase the scheduling delay and/or increase the amount of latency experienced.

TABLE 2

| Video Frame Delivery Latency (ms) | |
| --- | --- |
| FEC (%) | 99% |
| 0 | 4.125 |
| 10 | 4 |
| 20 | 3.25 |
| 30 | 3.25 |

Table 2 above shows one example of video frame delivery latency with a medium or high SINR, e.g., corresponding to a large TB. In Table 2, the impact of FEC may be marginal at the $99^{th}$ percentile. Also, the 0.1% residual BLER may correspond to less than a 1% probability of retransmission, e.g., for less than 10 TBs. There may also be a fallback to the small TB case if the packets are spread over many slots. For example, server packets may naturally be spread over a few ms.

A number of cloud gaming or XR/AR/VR platforms in the market may employ FEC on video frames for reliability. This FEC may occur with a fixed FEC rate. However, there are a number of potential issues with a fixed FEC rate when running on certain types of wireless communications, e.g., 5G networks. For example, there may be an insufficient FEC, i.e., less than a TB, which may result in resource waste, e.g., where a video frame cannot be 100% recovered from a single TB loss. In some aspects, there may also be an over-provisioned FEC, which may result in an increased scheduling latency of packets across video frames.

Additionally, the effectiveness of FEC in maintaining low latency, e.g., latency at a 99th percentile, may vary with an allocated TB size and a number of TBs to transmit to a video frame. In order to balance between the latency performance and efficiency, it may be beneficial to adapt the FEC rate. For instance, it may be beneficial to adapt the FEC rate based on the TB size. It may also be beneficial to adapt the FEC rate based on the number of TBs for transmitting a video frame.

Aspects of the present disclosure may be associated with FEC rate adaptation, e.g., based on a transport block allocation. Aspects of the present disclosure can also adapt the FEC rate in order to maintain a low latency. For instance, the present disclosure may adapt the FEC rate based on the TB size. Additionally, aspects of the present disclosure can adapt the FEC rate based on the number of TBs for transmitting a video frame.

Some aspects of the present disclosure, e.g., client devices or applications, may query another component, e.g., a modem or infrastructure component, for a variety of information. For instance, aspects of the present disclosure may query for an average TB size over a time window. Aspects of the present disclosure may also query for an average number of internet protocol (IP) packets carried in a single transmission or TB. Aspects of the present disclosure may also query for a residual block error rate (BLER) of a HARQ process. Based on the above information, aspects of the present disclosure, e.g., client devices, may derive a target FEC rate and forward a recommendation of a target FEC rate, e.g., to a server.

Aspects of the present disclosure may perform an updated or target FEC determination in a number of different manners. For instance, the present disclosure may estimate the number of transport blocks (Num_TB) based on the sum of a number of IP packets of a frame and/or a 5G overhead, and then divide this amount by the average TB size. Also, the present disclosure may estimate the Num_TB by the average number of IP packets per video frame, which may be divided by the average number of IP packets carried per TB. Aspects of the present disclosure may also estimate a frame loss probability ($P_{frameloss}$) during HARQ transmission, which may be approximately equal to the Num_TB multiplied by the residual BLER. In some aspects, if $P_{frameloss}$ is less than an amount, e.g., 1%, there may be no need for a FEC. Otherwise, the target FEC percentage=(N×TB−5G and IP overheads)/video frame size, where N denotes the number of TB loss of a frame at the $99^{th}$ percentile. In some aspects, a default value may be N=1, which may be increased to account for burst errors.

In some aspects, a server may receive a recommendation or indication of the updated FEC rate from the client device. After receiving the updated FEC rate, the server may adjust the FEC rate accounting for the client device recommendation. In some aspects, other information, e.g., downlink SINR, NACK or discontinuous transmission (DTX) to ACK detection probability and/or a base station retransmission time (K3), may also be obtained and applied when determining the FEC rate.

Figure 6:
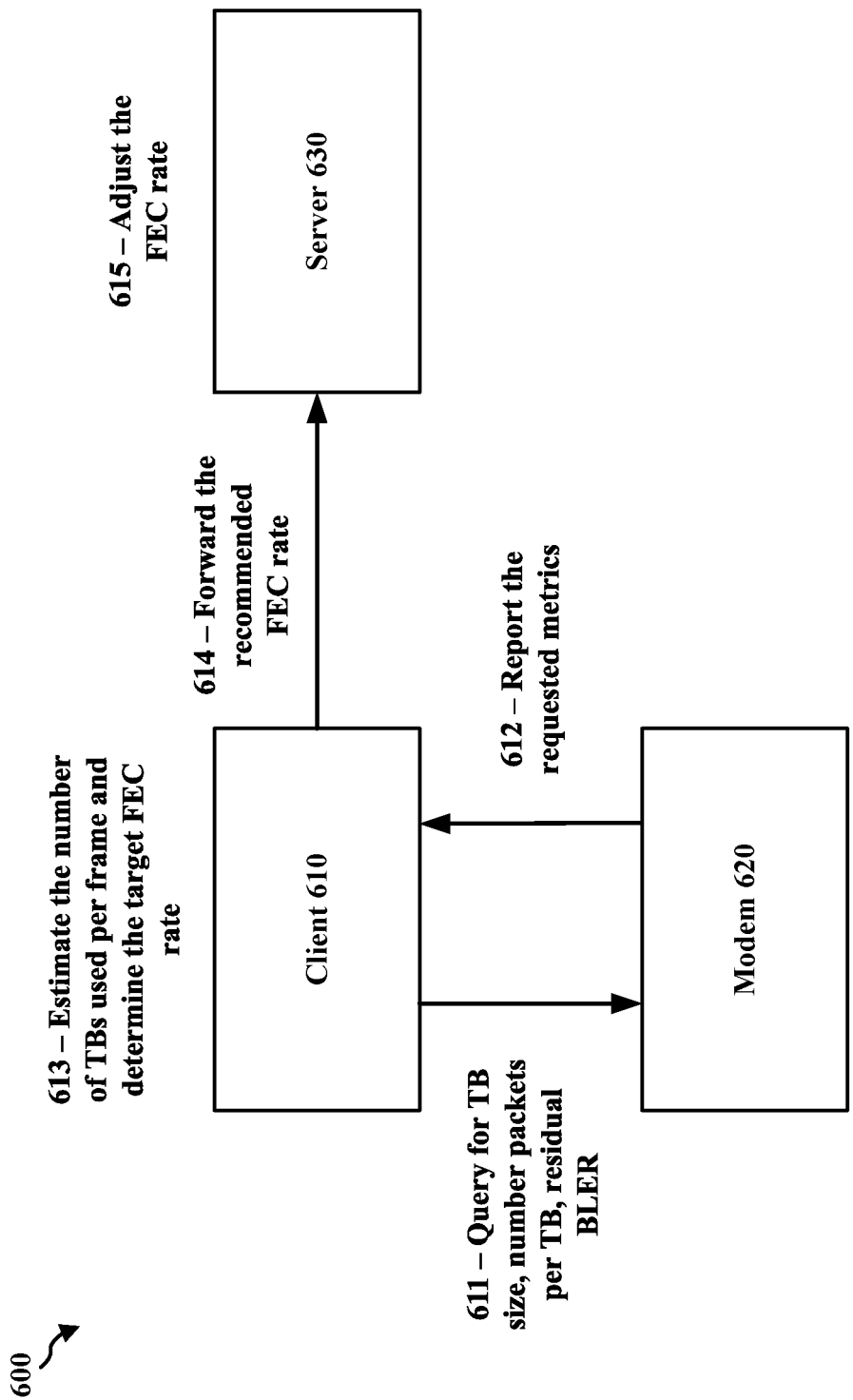
FIG. 6 illustrates an example diagram of FEC rate adaptation in accordance with one or more techniques of this disclosure.

FIG. 6 illustrates diagram 600 of FEC rate adaptation. As shown in FIG. 6, diagram 600 includes client device 610, modem 620, and server 630. At 611, client device 610 may query or request modem 620 for a number of metrics, e.g., a TB size, a number packets per TB, and/or a residual BLER. At 612, modem 620 may report the requested metrics to client device 610. At 613, client device 610 may estimate the number of TBs user per frame, as well as determine the target FEC rate. At 614, client device 610 may forward the recommended FEC rate to the server 630. Finally, at 615, the server 630 may adjust the FEC rate.

Some aspects of the present disclosure, e.g., networks or servers, may query another component, e.g., a 5G infrastructure component, for a variety of information. In some instances, this information may be queried via certain types of signaling. For instance, aspects of the present disclosure may query for an average TB size over a time window. Aspects of the present disclosure may also query for an average number of internet protocol (IP) packets carried in a single transmission or TB. Aspects of the present disclosure may also query for a residual block error rate (BLER) of a HARQ process. Based on the above information, aspects of the present disclosure, e.g., networks or servers, may derive a target FEC rate and apply the target FEC rate accordingly.

In yet other aspects, the present disclosure, e.g., networks or servers, may query other components, e.g., a 5G infrastructure components, for a variety of information, such as the target FEC rate. This information may also be queried via signaling. For instance, based on a TB size and/or a BLER measurement, e.g., from a base station, aspects of the present disclosure, e.g., a dedicated 5G infrastructure component, may compute and forward the updated FEC rate to the application server or network. Networks and servers may receive the updated FEC rate from the dedicated 5G infrastructure component. Based on the above information, aspects of the present disclosure, e.g., networks or servers, may adjust the target FEC rate and/or apply the target FEC rate accordingly. In some aspects, the client device may query the modem for the target FEC rate. The modem can derive or compute the target FEC rate based on the TB size and/or BLER. The modem can then forward the target FEC rate to the client device. After receiving the target FEC rate, the client device can adjust the target FEC rate and/or apply the target FEC rate.

Figure 7:
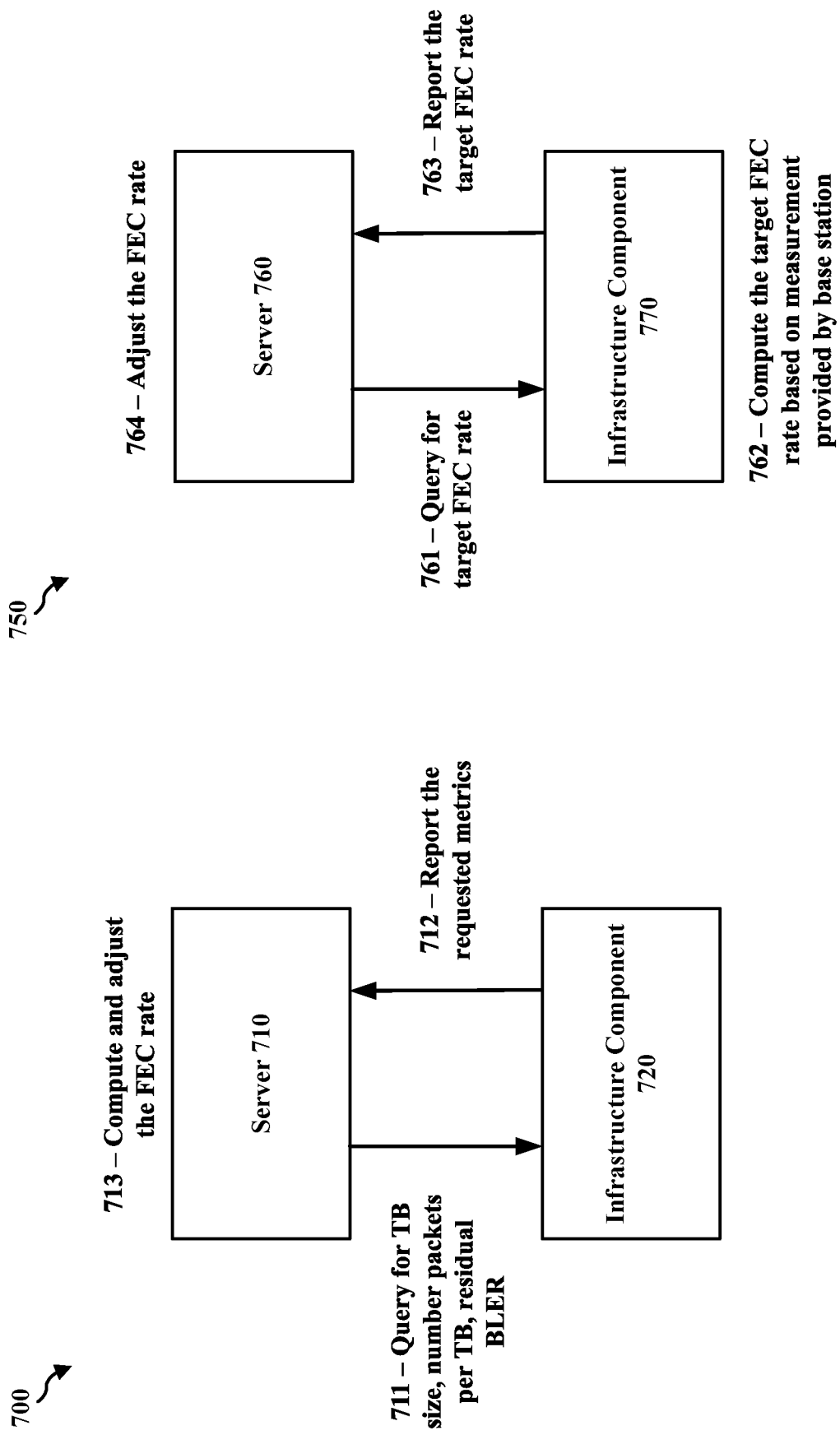
FIGS. 7A and 7B illustrate example diagrams of FEC rate adaptation in accordance with one or more techniques of this disclosure.

FIGS. 7A and 7B illustrate diagrams 700 and 750, respectively, of FEC rate adaptation. As shown in FIG. 7A, diagram 700 includes server 710 and infrastructure component 720. At 711, server 710 may query or request infrastructure component 720 for a number of metrics, e.g., a TB size, a number of packets per TB, and/or a residual BLER. At 712, infrastructure component 720 may report the requested metrics to server 710. At 713, server 710 may compute and/or adjust the FEC rate based on the metrics from infrastructure component 720.

As shown in FIG. 7B, diagram 750 includes server 760 and infrastructure component 770. At 761, server 760 may query or request infrastructure component 770 for a target FEC rate. At 762, infrastructure component 770 may compute the target FEC rate based on a measurement provided by a base station. At 763, infrastructure component 770 may report the target FEC rate to the server 760. At 764, server 760 may adjust the FEC rate based on the report from infrastructure component 770.

Aspects of the present disclosure may include a number of benefits or advantages. For instance, aspects of the present disclosure may exploit statistics from certain components, e.g., TB related statistics that are obtained via a modem or 5G infrastructure components, in order to help cloud gaming servers or XR/AR/VR servers configure a correct amount of FEC. By doing so, aspects of the present disclosure may obtain an improved latency. Additionally, aspects of the present disclosure may enable applications of FEC adaptation via certain components, e.g., modems or 5G infrastructure components.

FIGS. 3-7B illustrate examples of the aforementioned methods and processes for FEC rate adaptation. As shown in FIGS. 3-7B, aspects of the present disclosure, e.g., networks, servers, and client devices herein, can perform a number of different steps or processes for FEC rate adaptation in order to reduce the amount of latency experienced. For instance, networks, servers, and client devices herein may operate or stream data based on a previous forward error correction (FEC) rate.

Networks, servers, and client devices herein, e.g., client device 610, may also transmit a request for an updated FEC rate, e.g., query 611, the updated FEC rate being based on a previous FEC rate. In some aspects, the transmitted request may include a request for at least one of an average transport block (TB) size over a time window, an average amount of internet protocol (IP) packets in a TB, or a residual block error rate (BLER) of a hybrid automatic repeat request (HARQ) process. Also, the request may be transmitted by at least one of a client device, a server, or a network.

Networks, servers, and client devices herein, e.g., client device 610, may also receive, based on the request for the updated FEC rate, information associated with the updated FEC rate, e.g., report 612. The information may be received from at least one of a modem or a network infrastructure component.

Additionally, networks, servers, and client devices herein, e.g., client device 610, may calculate an average transport block (TB) size per frame based on the received information, e.g., estimate 613. The updated FEC rate may be based on the average TB size per frame, the average TB size per frame being associated with one or more internet protocol (IP) packets.

Networks, servers, and client devices herein, e.g., client device 610, may also determine the updated FEC rate based on the received information, e.g., determination 613, the received information being associated with a difference between the previous FEC rate and the updated FEC rate. The updated FEC rate may be determined based on at least one of an estimated number of transport blocks (TBs) or an estimated frame loss probability. Also, the estimated number of TBs may be based on a total number of internet protocol (IP) packets in a frame and an average TB size, or the estimated number of TBs is based on an average number of IP packets per frame and an average number of IP packets per TB. In some instances, the previous FEC rate may not be adjusted to the updated FEC rate when the estimated frame loss probability is less than a frame loss threshold.

Networks, servers, and client devices herein, e.g., client device 610, may also transmit, to a network or a server, an indication of the updated FEC rate, e.g., recommendation 614. In some aspects, the updated FEC rate may correspond to a target FEC rate, the target FEC rate being predetermined or preconfigured.

Moreover, networks, servers, and client devices herein, e.g., client device 610 or server 630, may adjust the previous FEC rate to the updated FEC rate based on the received information, e.g., adjustment 615.

Networks, servers, and client devices herein, e.g., client device 610, may also operate or stream data based on the updated FEC rate.

Figure 8:
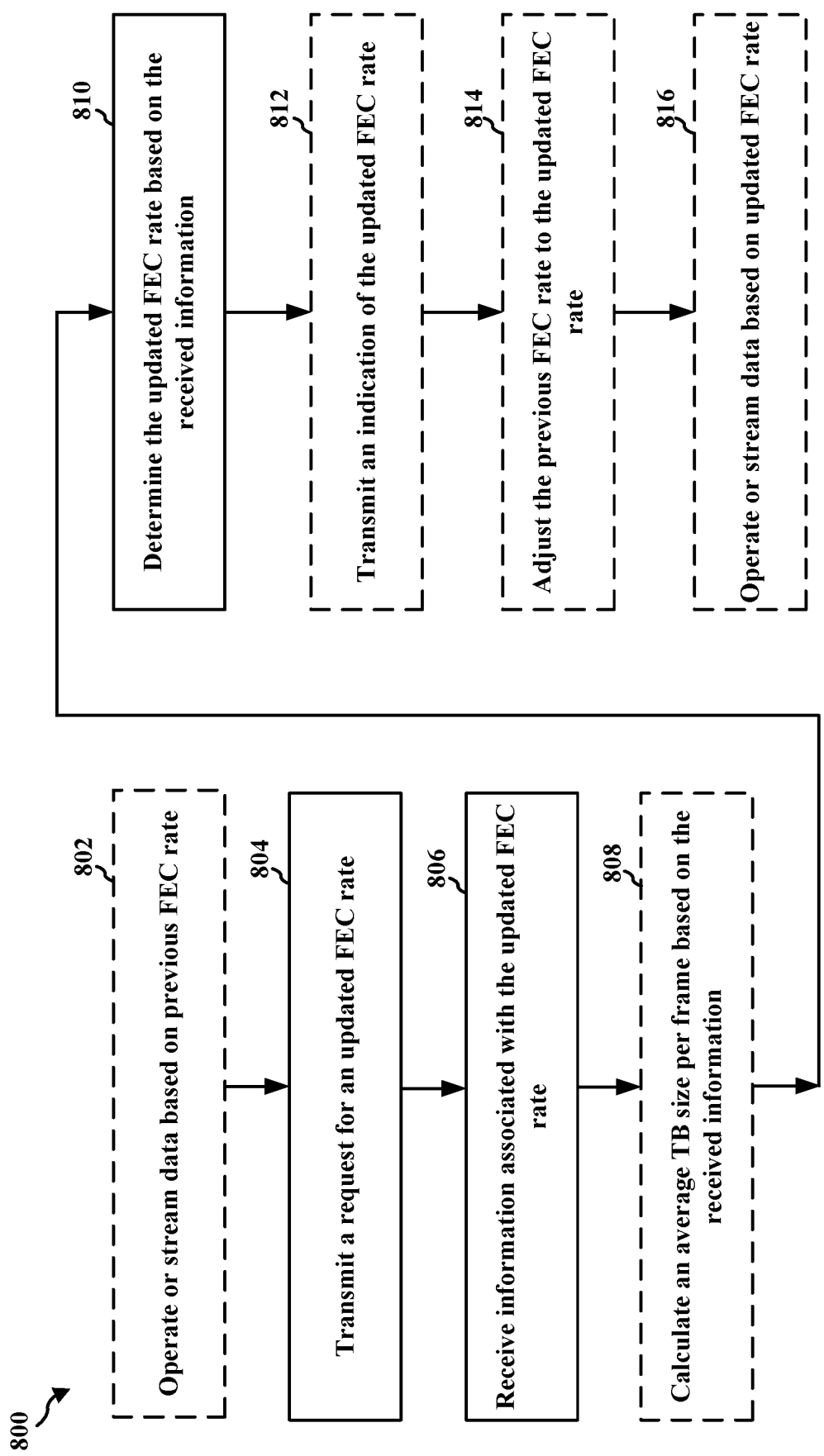
FIG. 8 illustrates an example flowchart of an example method in accordance with one or more techniques of this disclosure.

FIG. 8 illustrates a flowchart 800 of an example method in accordance with one or more techniques of this disclosure. The method may be performed by an apparatus such as a network, a server, a client device, a modem, an infrastructure component, or an apparatus for data or frame processing.

At 802, the apparatus may operate or stream data based on a previous forward error correction (FEC) rate, as described in connection with the examples in FIGS. 3, 4, 5A, 5B, 6, 7A, and 7B.

At 804, the apparatus may transmit a request for an updated FEC rate, the updated FEC rate being based on a previous FEC rate, as described in connection with the examples in FIGS. 3, 4, 5A, 5B, 6, 7A, and 7B. In some aspects, the transmitted request may include a request for at least one of an average transport block (TB) size over a time window, an average amount of internet protocol (IP) packets in a TB, or a residual block error rate (BLER) of a hybrid automatic repeat request (HARQ) process, as described in connection with the examples in FIGS. 3, 4, 5A, 5B, 6, 7A, and 7B. Also, the request may be transmitted by at least one of a client device, a server, or a network, as described in connection with the examples in FIGS. 3, 4, 5A, 5B, 6, 7A, and 7B.

At 806, the apparatus may receive, based on the request for the updated FEC rate, information associated with the updated FEC rate, as described in connection with the examples in FIGS. 3, 4, 5A, 5B, 6, 7A, and 7B. The information may be received from at least one of a modem or a network infrastructure component, as described in connection with the examples in FIGS. 3, 4, 5A, 5B, 6, 7A, and 7B.

At 808, the apparatus may calculate an average transport block (TB) size per frame based on the received information, as described in connection with the examples in FIGS. 3, 4, 5A, 5B, 6, 7A, and 7B. The updated FEC rate may be based on the average TB size per frame, the average TB size per frame being associated with one or more internet protocol (IP) packets, as described in connection with the examples in FIGS. 3, 4, 5A, 5B, 6, 7A, and 7B.

At 810, the apparatus may determine the updated FEC rate based on the received information, the received information being associated with a difference between the previous FEC rate and the updated FEC rate, as described in connection with the examples in FIGS. 3, 4, 5A, 5B, 6, 7A, and 7B. The updated FEC rate may be determined based on at least one of an estimated number of transport blocks (TBs) or an estimated frame loss probability, as described in connection with the examples in FIGS. 3, 4, 5A, 5B, 6, 7A, and 7B. Also, the estimated number of TBs may be based on a total number of internet protocol (IP) packets in a frame and an average TB size, or the estimated number of TBs is based on an average number of IP packets per frame and an average number of IP packets per TB, as described in connection with the examples in FIGS. 3, 4, 5A, 5B, 6, 7A, and 7B. In some instances, the previous FEC rate may not be adjusted to the updated FEC rate when the estimated frame loss probability is less than a frame loss threshold, as described in connection with the examples in FIGS. 3, 4, 5A, 5B, 6, 7A, and 7B.

At 812, the apparatus may transmit, to a network or a server, an indication of the updated FEC rate. In some aspects, the updated FEC rate may correspond to a target FEC rate, the target FEC rate being predetermined or preconfigured, as described in connection with the examples in FIGS. 3, 4, 5A, 5B, 6, 7A, and 7B.

At 814, the apparatus may adjust the previous FEC rate to the updated FEC rate based on the received information, as described in connection with the examples in FIGS. 3, 4, 5A, 5B, 6, 7A, and 7B.

At 816, the apparatus may operate or stream data based on the updated FEC rate, as described in connection with the examples in FIGS. 3, 4, 5A, 5B, 6, 7A, and 7B.

Figure 9:
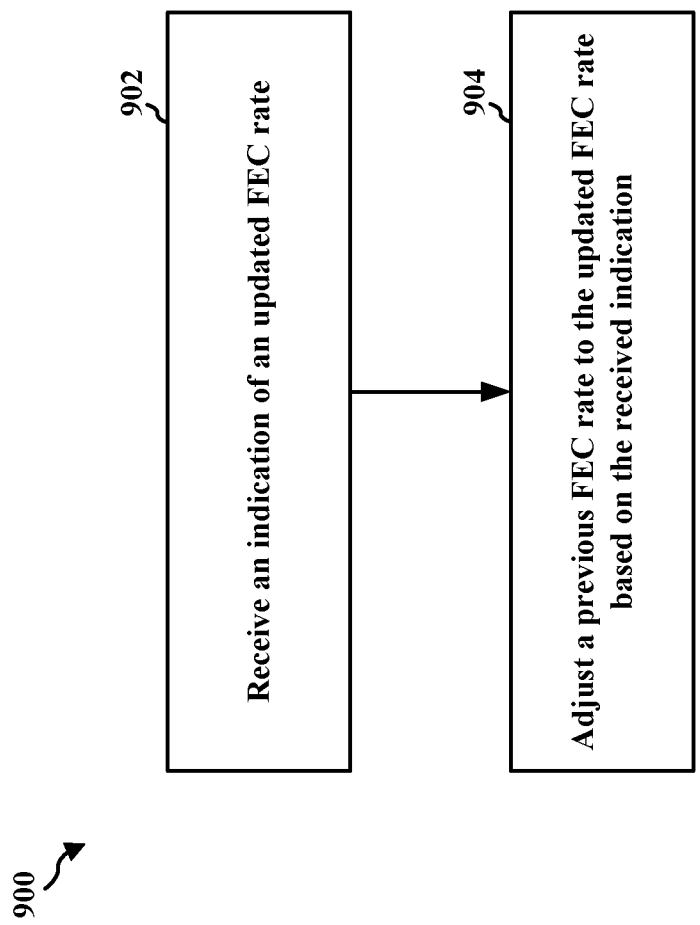
FIG. 9 illustrates an example flowchart of an example method in accordance with one or more techniques of this disclosure.

FIG. 9 illustrates a flowchart 900 of an example method in accordance with one or more techniques of this disclosure. The method may be performed by an apparatus such as a network, a server, a client device, a modem, an infrastructure component, or an apparatus for data or frame processing.

At 902, the apparatus may receive an indication of an updated forward error correction (FEC) rate, the updated FEC rate being based on a previous FEC rate, the received indication including a difference between the previous FEC rate and the updated FEC rate, as described in connection with the examples in FIGS. 3, 4, 5A, 5B, 6, 7A, and 7B. In some aspects, the received indication is based on a request for at least one of an average transport block (TB) size over a time window, an average amount of internet protocol (IP) packets in a TB, or a residual block error rate (BLER) of a hybrid automatic repeat request (HARQ) process, as described in connection with the examples in FIGS. 3, 4, 5A, 5B, 6, 7A, and 7B. Also, the indication may be received from at least one of a client device, a server, or a network, and where the indication may be received by at least one of a server or a network, as described in connection with the examples in FIGS. 3, 4, 5A, 5B, 6, 7A, and 7B.

At 904, the apparatus may adjust a previous FEC rate to the updated FEC rate based on the received indication, the adjustment based on the difference between the previous FEC rate and the updated FEC rate, as described in connection with the examples in FIGS. 3, 4, 5A, 5B, 6, 7A, and 7B. In some aspects, the updated FEC rate may be based on at least one of an estimated number of transport blocks (TBs) or an estimated frame loss probability, as described in connection with the examples in FIGS. 3, 4, 5A, 5B, 6, 7A, and 7B. The estimated number of TBs may be based on a total number of internet protocol (IP) packets in a frame and an average TB size, or the estimated number of TBs is based on an average number of IP packets per frame and an average number of IP packets per TB, as described in connection with the examples in FIGS. 3, 4, 5A, 5B, 6, 7A, and 7B. In some instances, the previous FEC rate may not be adjusted to the updated FEC rate when the estimated frame loss probability is less than a frame loss threshold, as described in connection with the examples in FIGS. 3, 4, 5A, 5B, 6, 7A, and 7B.

Additionally, an average transport block (TB) size per frame may be calculated based on the received indication, as described in connection with the examples in FIGS. 3, 4, 5A, 5B, 6, 7A, and 7B. The updated FEC rate may be based on the average TB size per frame, the average TB size per frame being associated with one or more internet protocol (IP) packets, as described in connection with the examples in FIGS. 3, 4, 5A, 5B, 6, 7A, and 7B. Data may be streamed based on the updated FEC rate, as described in connection with the examples in FIGS. 3, 4, 5A, 5B, 6, 7A, and 7B. Further, data may be streamed based on the previous FEC rate, as described in connection with the examples in FIGS. 3, 4, 5A, 5B, 6, 7A, and 7B. The updated FEC rate may correspond to a target FEC rate, the target FEC rate being predetermined or preconfigured, as described in connection with the examples in FIGS. 3, 4, 5A, 5B, 6, 7A, and 7B.

In one configuration, a method or apparatus for graphics processing is provided. The apparatus may be a network, a server, a client device, a modem, an infrastructure component, or some other processor that can perform data or frame processing. In one aspect, the apparatus may be the processing unit 120 within the device 104, or may be some other hardware within device 104 or another device. The apparatus may include means for transmitting a request for an updated forward error correction (FEC) rate, the updated FEC rate being based on a previous FEC rate. The apparatus may also include means for receiving, based on the request for the updated FEC rate, information associated with the updated FEC rate. The apparatus may also include means for determining the updated FEC rate based on the received information, the received information being associated with a difference between the previous FEC rate and the updated FEC rate. The apparatus may also include means for calculating an average transport block (TB) size per frame based on the received information. The apparatus may also include means for transmitting, to a network or a server, an indication of the updated FEC rate. The apparatus may also include means for adjusting the previous FEC rate to the updated FEC rate based on the received information. The apparatus may also include means for operating or streaming data based on the updated FEC rate. The apparatus may also include means for operating or streaming data based on the previous FEC rate. In some aspects, the apparatus may also include means for receiving an indication of an updated forward error correction (FEC) rate, the updated FEC rate being based on a previous FEC rate, the received indication including a difference between the previous FEC rate and the updated FEC rate. The apparatus may also include means for adjusting a previous FEC rate to the updated FEC rate based on the received indication, the adjustment based on the difference between the previous FEC rate and the updated FEC rate.

The subject matter described herein can be implemented to realize one or more benefits or advantages. For instance, the described data or frame processing techniques can be used by a network, a server, a client device, or some other processor that can perform data or frame processing to implement the FEC rate adaptation techniques described herein. This can also be accomplished at a low cost compared to other data or frame processing techniques. Moreover, the data or frame processing techniques herein can improve or speed up data processing or execution. Further, the data or frame processing techniques herein can improve resource or data utilization and/or resource efficiency. Additionally, aspects of the present disclosure can utilize FEC rate adaptation techniques in order to improve processing time, reduce latency, and/or reduce performance overhead.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of data processing, comprising:
   transmitting a request for an updated forward error correction (FEC) rate, the updated FEC rate being based on a previous FEC rate;
   receiving, based on the request for the updated FEC rate, information associated with the updated FEC rate;
   calculating an average transport block (TB) size per frame based on the received information; and
   determining the updated FEC rate based on the received information, the received information being associated with a difference between the previous FEC rate and the updated FEC rate.

2. The method of claim 1, wherein the transmitted request includes a request for at least one of the average TB size over a time window, an average amount of internet protocol (IP) packets in a TB, or a residual block error rate (BLER) of a hybrid automatic repeat request (HARQ) process.

3. The method of claim 1, wherein the updated FEC rate is determined based on at least one of an estimated number of transport blocks (TBs) or an estimated frame loss probability.

4. The method of claim 3, wherein the estimated number of TBs is based on a total number of internet protocol (IP) packets in a frame and an average TB size, or the estimated number of TBs is based on an average number of IP packets per frame and an average number of IP packets per TB.

5. The method of claim 3, wherein the previous FEC rate is not adjusted to the updated FEC rate when the estimated frame loss probability is less than a frame loss threshold.

6. The method of claim 1, wherein the updated FEC rate is based on the average TB size per frame, the average TB size per frame being associated with one or more internet protocol (IP) packets.

7. The method of claim 1, further comprising:
   transmitting, to a network or a server, an indication of the updated FEC rate.

8. The method of claim 1, further comprising:
   adjusting the previous FEC rate to the updated FEC rate based on the received information.

9. The method of claim 1, further comprising:
   operating or streaming data based on the updated FEC rate.

10. The method of claim 1, wherein the updated FEC rate corresponds to a target FEC rate, the target FEC rate being predetermined or preconfigured.

11. The method of claim 1, further comprising:
    operating or streaming data based on the previous FEC rate.

12. The method of claim 1, wherein the request is transmitted by at least one of a client device, a server, or a network.

13. The method of claim 1, wherein the information is received from at least one of a modem or a network infrastructure component.

14. An apparatus for data processing, comprising:
    a memory; and
    at least one processor coupled to the memory and configured to:
      transmit a request for an updated forward error correction (FEC) rate, the updated FEC rate being based on a previous FEC rate;
      receive, based on the request for the updated FEC rate, information associated with the updated FEC rate;
      calculate an average transport block (TB) size per frame based on the received information; and
      determine the updated FEC rate based on the received information, the received information being associated with a difference between the previous FEC rate and the updated FEC rate.

15. The apparatus of claim 14, wherein the updated FEC rate is based on the average TB size per frame, the average TB size per frame being associated with one or more internet protocol (IP) packets.

16. The apparatus of claim 14, wherein the transmitted request includes a request for at least one of the average TB size over a time window, an average amount of internet protocol (IP) packets in a TB, or a residual block error rate (BLER) of a hybrid automatic repeat request (HARQ) process.

17. The apparatus of claim 14, wherein the updated FEC rate is determined based on at least one of an estimated number of transport blocks (TBs) or an estimated frame loss probability, wherein the estimated number of TBs is based on a total number of internet protocol (IP) packets in a frame and an average TB size, or the estimated number of TBs is based on an average number of IP packets per frame and an average number of IP packets per TB.

18. A method of data processing, comprising:
    receiving an indication of an updated forward error correction (FEC) rate, the updated FEC rate being based on a previous FEC rate, the received indication including a difference between the previous FEC rate and the updated FEC rate, wherein an average transport block (TB) size per frame is calculated based on the received indication; and adjusting the previous FEC rate to the updated FEC rate based on the received indication, the adjustment based on the difference between the previous FEC rate and the updated FEC rate.

19. The method of claim 18, wherein the received indication is based on a request for at least one of the average TB size over a time window, an average amount of internet protocol (IP) packets in a TB, or a residual block error rate (BLER) of a hybrid automatic repeat request (HARQ) process.

20. The method of claim 18, wherein the updated FEC rate is based on at least one of an estimated number of transport blocks (TBs) or an estimated frame loss probability.

21. The method of claim 20, wherein the estimated number of TBs is based on a total number of internet protocol (IP) packets in a frame and an average TB size, or the estimated number of TBs is based on an average number of IP packets per frame and an average number of IP packets per TB.

22. The method of claim 20, wherein the previous FEC rate is not adjusted to the updated FEC rate when the estimated frame loss probability is less than a frame loss threshold.

23. The method of claim 18, wherein the updated FEC rate is based on the average TB size per frame, the average TB size per frame being associated with one or more internet protocol (IP) packets.

24. The method of claim 18, wherein data is streamed based on the updated FEC rate.

25. The method of claim 18, wherein the updated FEC rate corresponds to a target FEC rate, the target FEC rate being predetermined or preconfigured.

26. The method of claim 18, wherein data is streamed based on the previous FEC rate.

27. The method of claim 18, wherein the indication is received from at least one of a client device, a server, or a network, and wherein the indication is received by at least one of the server or the network.

28. An apparatus for data processing, comprising:
a memory; and
at least one processor coupled to the memory and configured to:
receive an indication of an updated forward error correction (FEC) rate, the updated FEC rate being based on a previous FEC rate, the received indication including a difference between the previous FEC rate and the updated FEC rate, wherein an average transport block (TB) size per frame is calculated based on the received indication; and
adjust the previous FEC rate to the updated FEC rate based on the received indication, the adjustment based on the difference between the previous FEC rate and the updated FEC rate.

\* \* \* \* \*